Dec. 21, 1948.　　　　　E. A. RYKER　　　　　2,456,894
TRANSMISSION FOR MOTORIZED VEHICLES
Filed Dec. 17, 1946　　　　　　　　　　　　3 Sheets-Sheet 1

INVENTOR.
Elwood A. Ryker
BY
ATTORNEY

Dec. 21, 1948.   E. A. RYKER   2,456,894
TRANSMISSION FOR MOTORIZED VEHICLES
Filed Dec. 17, 1946   3 Sheets-Sheet 3

INVENTOR.
Elwood A. Ryker
BY
ATTORNEY

Patented Dec. 21, 1948

2,456,894

UNITED STATES PATENT OFFICE 2,456,894

TRANSMISSION FOR MOTORIZED VEHICLES

Elwood A. Ryker, Spokane, Wash.

Application December 17, 1946, Serial No. 716,747

3 Claims. (Cl. 74—343)

This invention relates to a transmission for motorized vehicles, mainly trucks and tractors, which provides a large number of forward speeds, all selectively shiftable by means of but one selector and shifting stick. In addition it also provides several reverse speeds which in the present disclosure are half the number of forward speeds.

While transmissions of conventional construction make it possible to obtain a number of forward speeds and to multiply the number of reverse speeds by use of an auxiliary transmission, either mounted amidship or integral with the rear axle, the full use of all the speeds so obtained is often prohibited by the necessity of having more than one shifting stick. This is especially true in the heavy duty dump-truck field where the majority of the drivers are only semi-skilled and are unable to master the shifting of more than one transmission at a time. Here also the difficult terrain over which vehicles operate often prohibit the use of all the gear combinations provided in two transmissions. Even when a unit is operating on a hard surfaced highway it is sometimes impossible for a driver to shift into a desired gear due to the fact that by the time he has completed shifting two transmissions the vehicle has lost so much momentum as to nullify the advantages of the gear obtained.

Therefore one object of the invention is to provide a transmission wherein the improved arrangement of shafts and gears allows a large number of forward speeds and also more than the usual number of reverse speeds is obtainable, thus allowing a large and heavily loaded truck or tractor to be safely driven at speeds not permitted with transmissions of a conventional construction.

Another object of the invention is to provide a transmission having its shafts and gears so arranged with respect to each other that the gears may be easily shifted in order to obtain desired speeds according to the grade or surface of a road along which a motor vehicle is moving.

Another object of the invention is to provide a transmission wherein a very compact arrangement of shafts and gears permits the transmission to be housed in a casing of small dimensions.

Another object of the invention is to provide an improved multiple speed transmission which is simple in construction, very easy to operate, and not liable to get out of working order.

The invention is illustrated in the accompanying drawings wherein.

Figure 1:
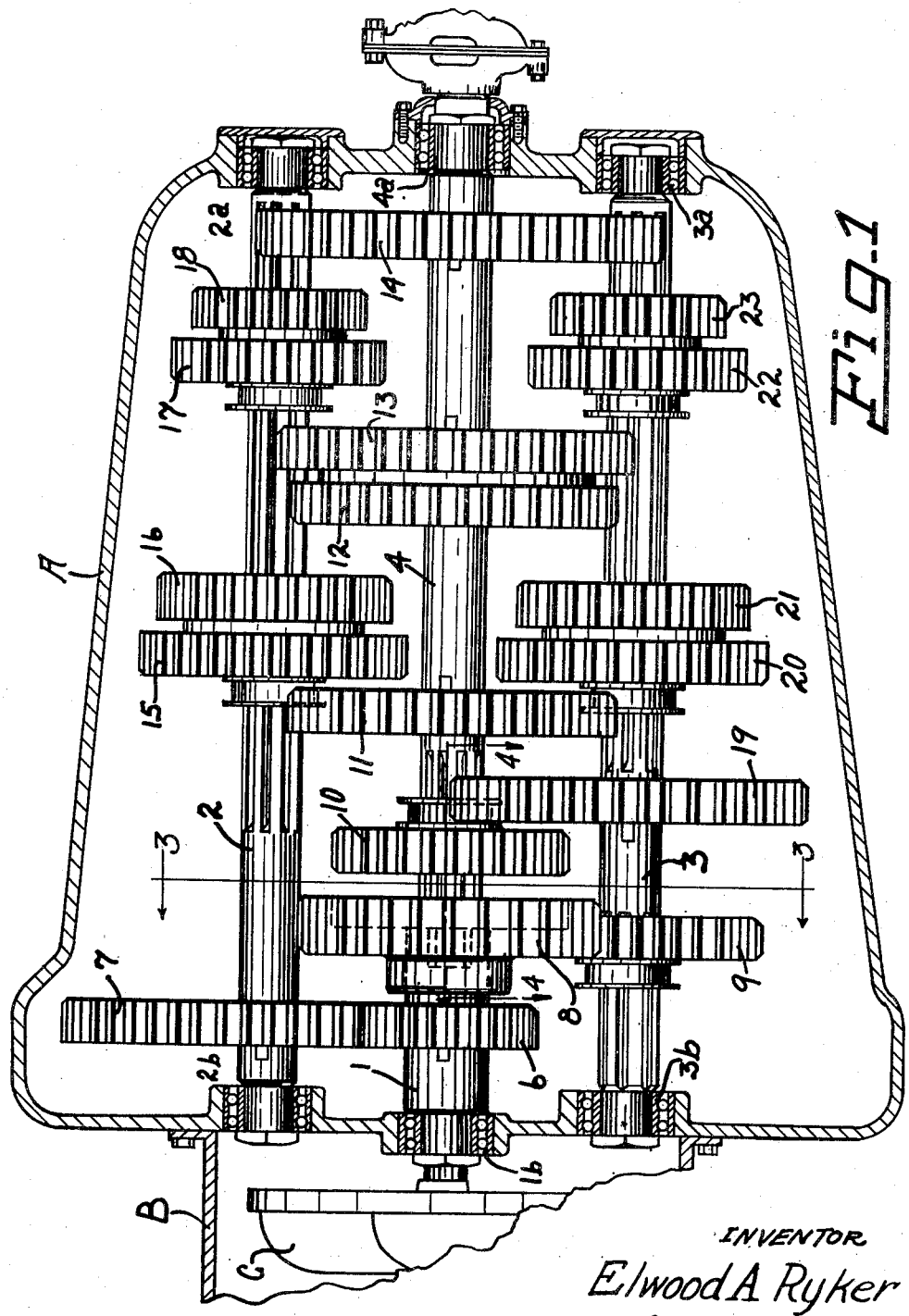
Fig. 1 is a view showing the improved transmission in top plan and the casing in longitudinal section.
Figure 2:
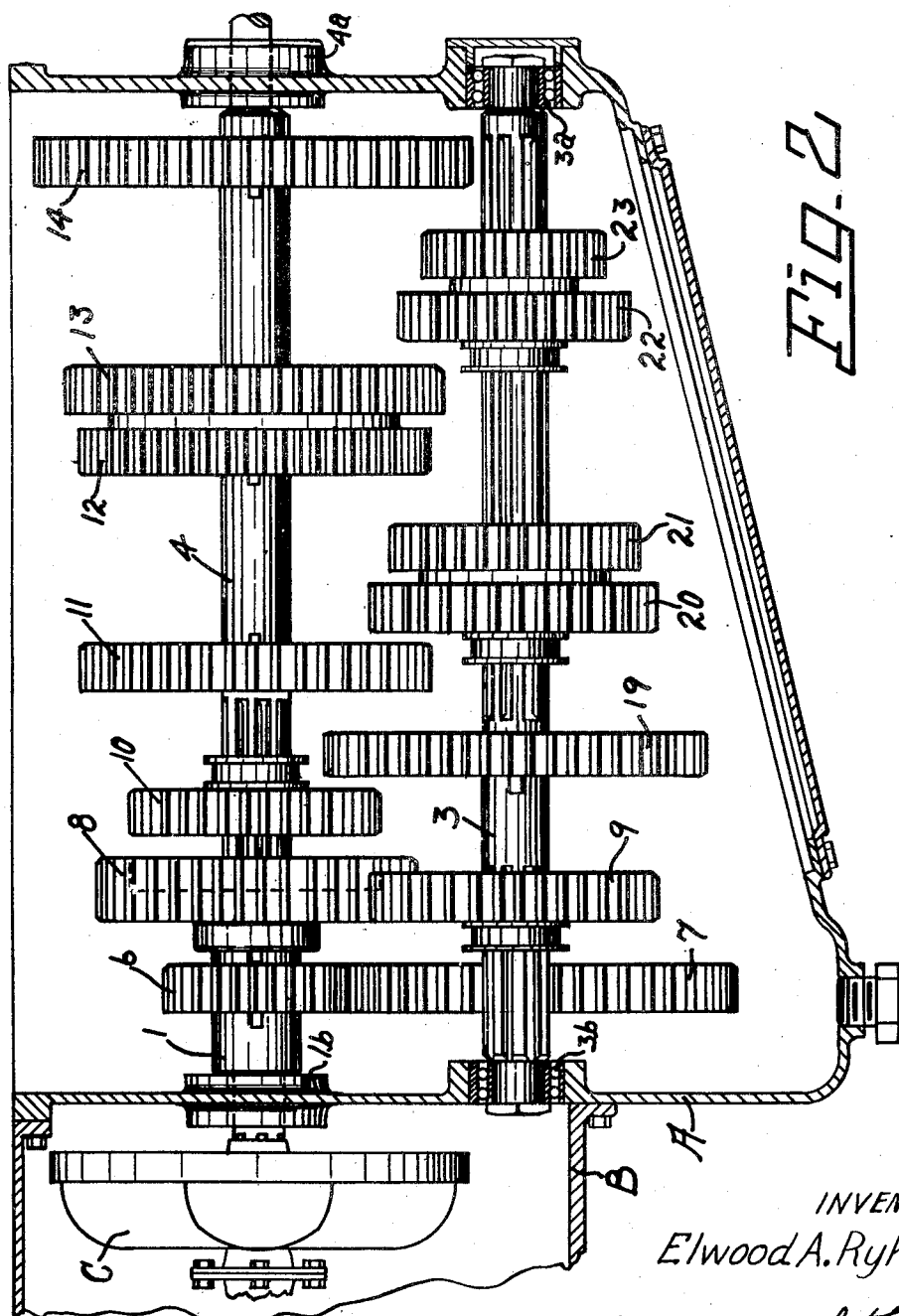
Fig. 2 is a view showing the casing in section and the transmission in side elevation.
Figure 3:
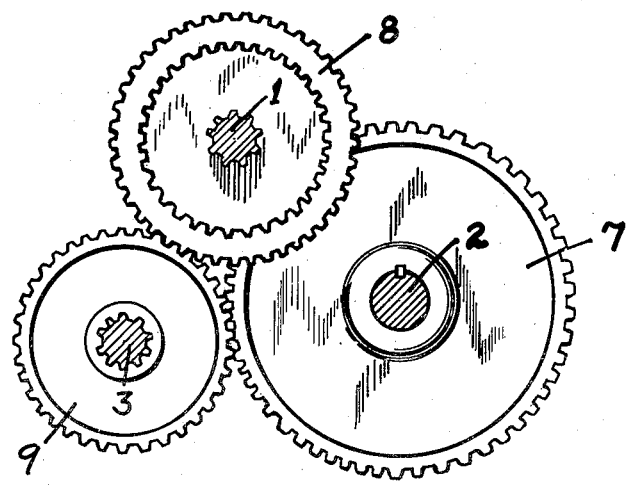
Fig. 3 is a fragmentary sectional view taken transversely through the transmission along the line 3—3 of Figure 1.
Figure 4:
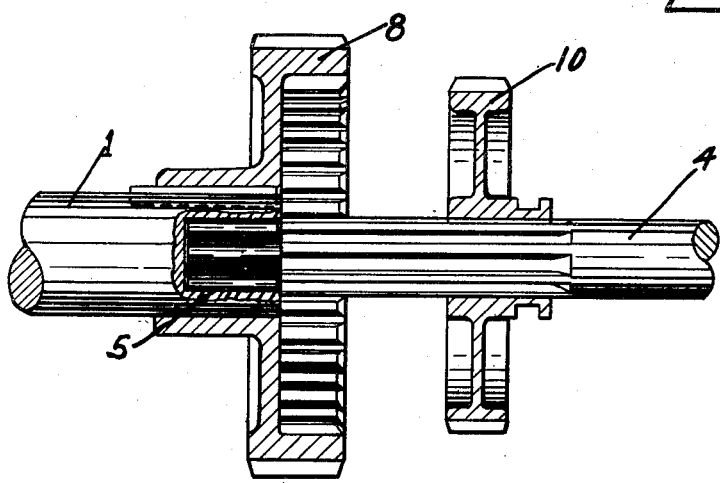
Figure 4 is a fragmentary view showing the connection between the clutch shaft and the main drive shaft of the transmission, as at line 4—4 of Fig. 1.

This improved transmission is mounted in a casing A which is of conventional form and is mounted in front of a casing B wherein is mounted a clutch C. The shaft 1 of the clutch extends into the casing A and constitutes a main drive shaft for the transmission. A low speed countershaft 2, a high speed countershaft 3, and a main shaft 4 extend longitudinally in the casing A and at their front ends are rotatably mounted in bearings 2a, 3a and 4a carried by the front wall of the casing. Rear ends of the shafts 2 and 3 are mounted in bearings 2b and 3b and the clutch shaft 1 is rotatably mounted through a bearing 1a, the inner or front end of the clutch shaft being formed with a bearing socket 5 in which is rotatably mounted the rear end of the main shaft 4. About the inner end portion of the shaft 1 is fixed a small gear 6 which meshes with a large gear 7 splined or otherwise fixed to the shaft 2, and the inner end of the shaft 1 carries a large gear 8 which is fixed to the shaft and has internal teeth as well as external teeth. A gear 9 turns with the shaft 3 but is slidable longitudinally thereon into and out of position for meshing with the external teeth of the gear 8. The shaft 4 carries a slidable gear 10 and also gears 11, 12, 13, and 14 which are fixed to this shaft and the shaft 2 is formed with longitudinally extending ribs so that a gear cluster 15 and 16 and a second gear cluster 17 and 18 may be mounted upon shaft 2 and slid longitudinally thereon and moved to adjusted positions for meshing with the gears 11 and 12 and gears 13 and 14 while turning with shaft 2. A fixed gear 19 is mounted upon the shaft 3 for meshing with the gear 10 when the gear 10 is slid along the shaft 4 to an operative position and the shaft 3 also carries a gear cluster 20 and 21 and a second gear cluster 22 and 23, the said gear clusters being slidable along the shaft to adjusted positions which permit the gears 20 and 21 to mesh with the gears 11 and 12 and the gears 22 and 23 to mesh with the gears 13 and 14.

Due to the difference in the sizes of the gears various speed ratios between the shafts are obtained. When the gear 10 is shifted into position for meshing with the internal teeth of the gear 8 on shaft 1, a direct connection at high speed is obtained and when the gear 10 is shifted into position to mesh with the gear 19 on shaft 3 a slow speed, which may be referred to as a tenth speed is obtained. Of the other eight speeds, the first four are obtained by sliding the gear clusters 15 and 16 and 17 and 18 along the low speed countershaft 2 into position to mesh with the companion fixed gears 11, 12, 13, and 14 carried by shaft 4 and the next four speeds are obtained by sliding the gear clusters on the high speed countershaft 3 into position for meshing with the companion fixed gears of the shaft 4. If the gear 18 is in mesh with the gear 14 a first gear speed is obtained and when gear 17 is in mesh with gear 13 a second gear speed is obtained.

When the gear 23 is in mesh with gear 14 a fifth gear speed is obtained and a sixth gear speed is obtained when gear 22 is in mesh with gear 13. When gear 9 on the high speed countershaft 3 is shifted into position to mesh with the gear 7 on the low speed countershaft 2 the low speed shaft acts as a reverse idler and the direction in which the shaft 3 rotates is reversed and all of the gears on this shaft become reverse gears. Gear 23 may then be shifted into position to mesh with gear 14 and becomes the first reverse speed, and when gear 22 is moved into mesh with gear 13 the second reverse speed is obtained. Placing gear 21 in mesh with gear 12 produces the third reverse speed and moving gear 20 into mesh with gear 11 produced the fourth reverse speed, while moving gear 10 into mesh with gear 19 provides the fifth reverse speed. If so desired the first four forward speeds can be used without shifting gear 9 on the high speed countershaft 3 back to a forward position as all of the gears on shaft 2 are still operative as forward speeds.

Having thus described the invention, what is claimed is:

1. In a transmission, a drive shaft, a main shaft aligned with the drive shaft and having one end rotatably engaged with the drive shaft, a low speed countershaft, a high speed countershaft intermeshing gears fixed to the low speed countershaft and the drive shaft, a large gear fixed to the drive shaft and disposed about the adjoining end portion of the main shaft and having inner and outer teeth, a gear slidable along the high speed countershaft into and out of mesh with the outer teeth of the large gear, a large gear fixed to the high speed countershaft, a small gear slidable along the main shaft from a position in mesh with the large gear of the high speed countershaft into a position to fit within and mesh with the internal teeth of the large gear of the drive shaft, a series of gears of different sizes fixed upon the main shaft, and gears smaller than the last mentioned gears on the main shaft and of different sizes slidable along the low speed countershaft and the high speed countershaft into and out of position for selective meshing with companion ones of the said last mentioned gears on the main shaft.

2. In a transmission, a drive shaft, a main shaft aligned with the drive shaft, a low speed countershaft, a high speed countershaft, means for continuously transmitting rotation from the drive shaft to the low speed countershaft at a constant speed ratio, a clutch member carried by the drive shaft and constituting a gear fixed to the said drive shaft, a gear slidable along the high speed countershaft into and out of mesh with the gear-forming clutch member, a gear fixed to the high speed countershaft, a clutch member slidable along the main shaft into and out of engagement with the clutch member of the drive shaft and constituting a shiftable gear slidable into and out of mesh with the fixed gear of the high speed countershaft, gears of different sizes fixed to the main shaft, and gear clusters slidable along the countershafts into and out of position for selective mesh with the fixed gears of the main shaft.

3. In a transmission, a drive shaft, a main shaft aligned with the drive shaft, a low speed countershaft, a high speed countershaft, means for continuously transmitting rotation from the drive shaft to the low speed countershaft at a constant speed ratio, a clutch member carried by the drive shaft and constituting a gear fixed to the said drive shaft, a gear slidable along the high speed countershaft into and out of mesh with the gear-forming clutch member, a gear fixed to the high speed countershaft, a clutch member slidable along the main shaft into and out of engagement with the clutch member of the drive shaft and constituting a shiftable gear slidable into and out of mesh with the fixed gear of the high speed countershaft, and companion gears of different sizes carried by the main shaft and the countershafts, certain of the last mentioned gears being fixed gears and the others being slidable into and out of position for selective mesh with the companion fixed gears.

ELWOOD A. RYKER.

REFERENCES CITED

The following references are of record in the file of this patent:

UNITED STATES PATENTS

| Number | Name | Date |
| --- | --- | --- |
| 1,763,739 | Baits | June 17, 1930 |
| 1,989,271 | Curtis | Jan. 29, 1935 |
| 2,010,161 | Robbins | Aug. 6, 1935 |

FOREIGN PATENTS

| Number | Country | Date |
| --- | --- | --- |
| 119,098 | Great Britain | Sept. 26, 1918 |